E. L. LINAY.
DEVICE OR APPLIANCE FOR USE IN TEACHING CHILDREN.
APPLICATION FILED APR. 18, 1918.

1,310,997.

Patented July 22, 1919.

INVENTOR
ETHEL LOUISE LINAY
BY
ATTORNEYS

UNITED STATES PATENT OFFICE.

ETHEL LOUISE LINAY, OF READING, ENGLAND.

DEVICE OR APPLIANCE FOR USE IN TEACHING CHILDREN.

1,310,997.  Specification of Letters Patent.  Patented July 22, 1919.

Application filed April 18, 1918. Serial No. 229,361.

*To all whom it may concern:*

Be it known that I, ETHEL LOUISE LINAY, a subject of the King of Great Britain, residing at 14 Christchurch road, Reading, in the county of Berks, England, have invented new and useful Improvements in Devices or Appliances for Use in Teaching Children, of which the following is a specification.

My invention consists in an improved device, or appliance, for use in teaching children, especially such subjects as addition, subtraction, multiplication, division, proportions, calculations and the like, and to assist them to realize that a number is simply a proportion of that number to "unity."

The device, or appliance, which I have devised is intended more especially for use in educating children in accordance with systems such, for instance, as that known as the Montessori system.

The said device, or appliance, consists mainly of pieces made in such a way as to be very conveniently manipulated and capable of being arranged, or combined, together in proper order so that, in arranging them, the pupils will have to exercise their motor activities as well as their reasoning powers in such a way that, in accordance with systems of the aforesaid kind, their interest is aroused and their attention is, as far as possible, confined to the subject in hand. The said pieces are arranged and divided, and individually marked, in accordance with the particular subject or subjects to be taught.

I will, in describing my invention, refer to the accompanying drawing:—

Figure 1:
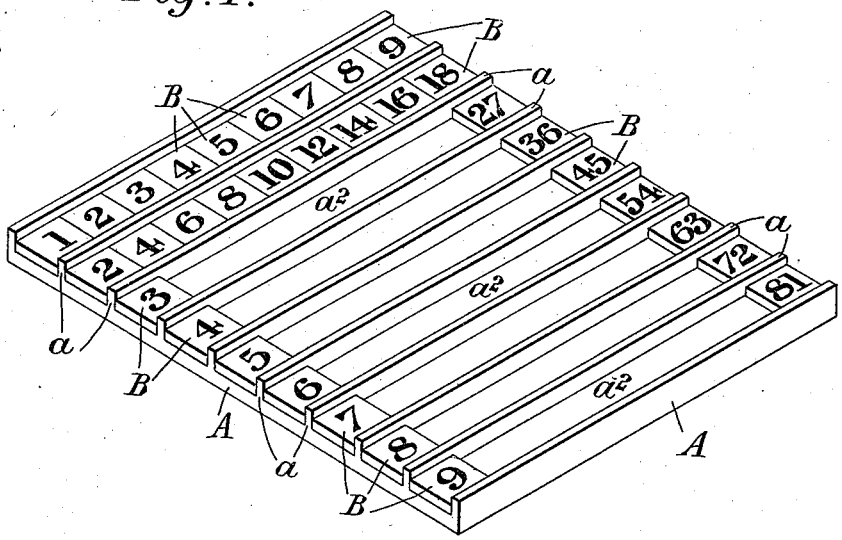
Figure 2:
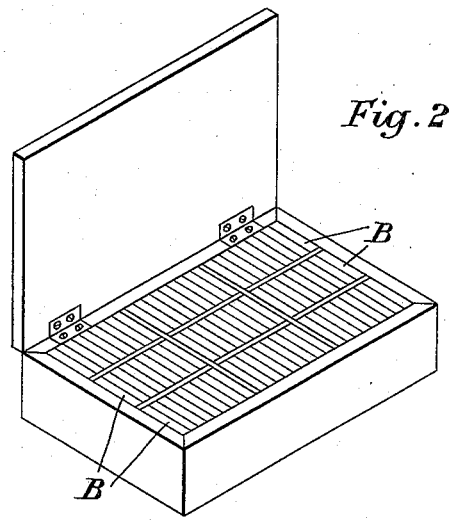

Figure 1 represents, in perspective, a device in accordance with my invention and consisting of a board divided, by horizontal ribs, into a number of longitudinal channels to receive blocks, or pieces, marked to denote the various values and adapted to fit together in the said channels. Fig. 2 shows a box for containing the said pieces.

For teaching more especially the values denoted by numerals, and addition, as a preparation more especially for learning the multiplication table, the board A Fig. 1, is divided by horizontal ribs, or bars, $a$, into a number of longitudinal channels, $a^2$ which constitute rows of spaces (which may be indicated by parallel lines extending from the top to the bottom of the board, intersecting the channels $a^2$) there being say nine rows of nine spaces each. I also provide a number of blocks, or pieces, B, each of which will cover an aforesaid space, so that, in the case instanced, there will be eighty-one of such blocks, or pieces, which will be marked with numerals representing the numbers made according to the multiplication table as far as nine multiplied by nine. These blocks, or pieces, are intended to be placed, in the instance given, in the order 1 to 9, in the top row of spaces and in the order 1 to 9, in the first spaces of the superposed rows and in such order in the other spaces that the figure on any given block, or piece, will be the multiple of the figures on the blocks, or pieces, respectively in the top space of the vertical row and in the left hand space of the horizontal row in which the given block, or piece, is situated, when in place. In the drawing I have shown only two complete rows of such blocks, or pieces, in place and blocks, or pieces, only in their spaces at the ends of all the other rows, but it will be understood that blocks, or pieces, are provided to fill all the spaces such blocks, or pieces, being marked with their proper numerals, or other marks, to denote their values. The blocks, or pieces, when not in use, are preferably kept in a box, such as that shown in Fig. 2, divided into nine compartments each to contain, set on edge, nine blocks or pieces, say, those in the several vertical rows.

What I claim is:

1. A device for teaching children comprising a series of blocks bearing numerals representing multiplicands and a related series of blocks bearing numerals of which one represents a multiplier and the rest the results of the arithmetical combination of said multiplier with the several multiplicands of the first series.

2. A device for teaching children comprising a series of blocks bearing numerals representing multiplicands, a plurality of related series of blocks, each series comprising one numeral which represents a multiplier while the rest of that series bear numerals representing the results of the arithmetical combination of said multiplier with the several multiplicands of the first series, the multipliers of the several series being different.

3. In a device such as specified in claim 2, multiplier blocks for the several series bearing numerals not only different but also successively greater.

4. In combination with a device such as specified in claim 2, a display board comprising separate channels, one for each of the several series of blocks and adapted to maintain the related numeral blocks of the several series in columns.

5. An educational device for teaching multiplication comprising a board having nine parallel channels, a series of 81 blocks adapted to fit such channels, nine to each channel, and bearing on one face numerical legends comprising for a first group of blocks the legends 1 to 9, one legend to each block, for a second group of eight blocks the legends 2 to 9, one legend to each block, and for a third group of sixty-four blocks the multiples of each of the numerals of the first series, except 1, by each of the numerals of the second series, each multiple constituting the legend for a single block in the third group, substantially as described.

In testimony whereof I have signed my name to this specification in the presence of two subscribing witnesses.

ETHEL LOUISE LINAY.

Witnesses:
FREDERICK WILLIAM MARTIN,
WALTER GILBERT HOUSE.

Copies of this patent may be obtained for five cents each, by addressing the "Commissioner of Patents, Washington, D. C."